CATHODE RAY TUBE
Filed Oct. 26, 1946
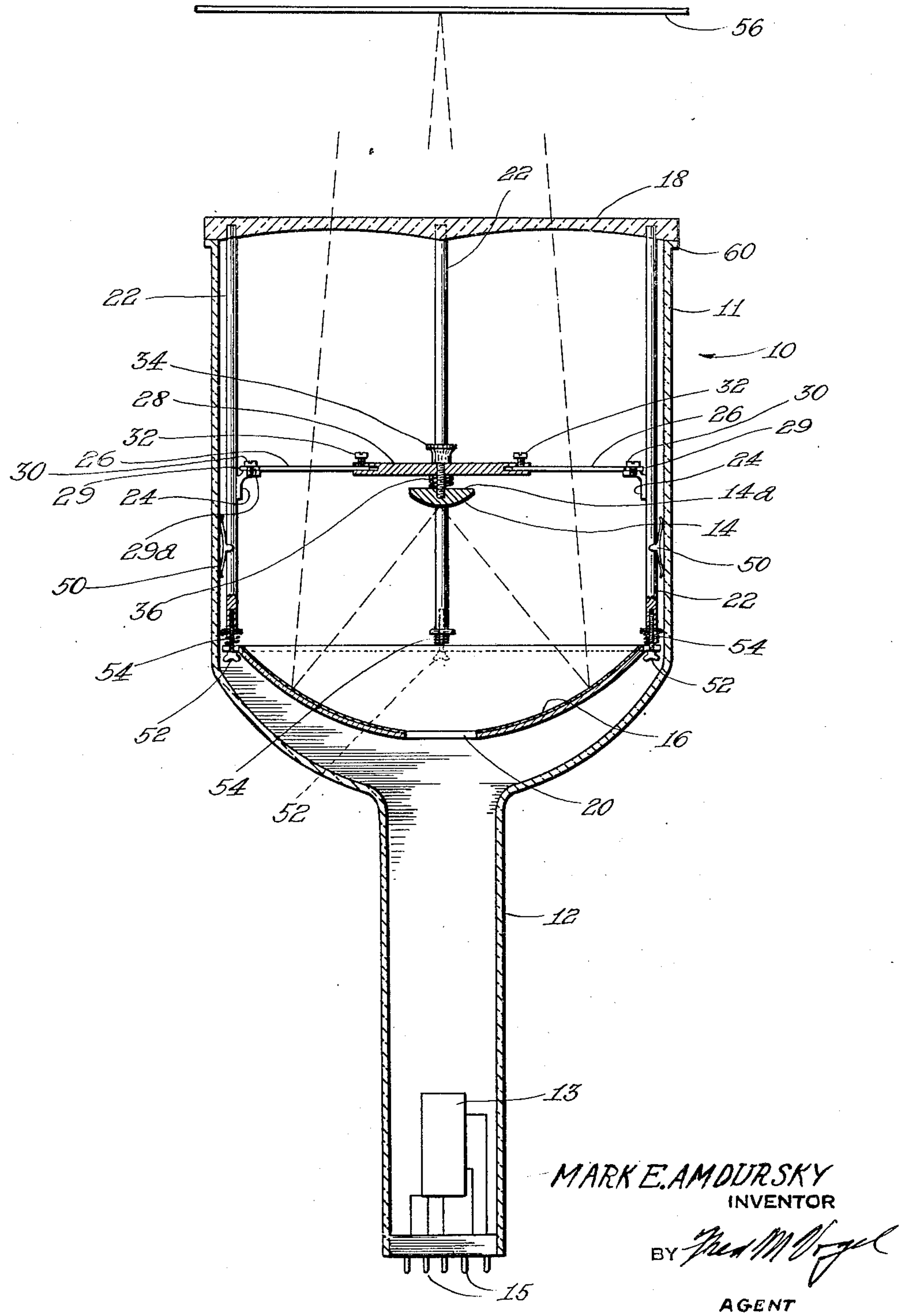
MARK E. AMDURSKY
INVENTOR
BY Fred M Vogel
AGENT

UNITED STATES PATENT OFFICE 2,520,190

CATHODE-RAY TUBE

Mark E. Amdursky, New York, N. Y., assignor to Philips Laboratories, Inc., Irvington on Hudson, N. Y.

Application October 26, 1946, Serial No. 705,850

3 Claims. (Cl. 250—141)

My invention relates to cathode ray tubes and more particularly to cathode ray tubes used in television.

In cathode ray tubes used for television reception, it is common to employ an image screen which is fluorescent, and which luminesces in response to a beam of cathode rays impinging on the screen. In tubes used for television transmission, it is common to employ a light responsive image screen upon which is focused the picture to be televised, and a beam of cathode rays impinging on the screen is employed to develop an electrical signal corresponding to the screen response. The invention will be more particularly described in connection with cathode ray television reception tubes, although it will be apparent to those skilled in the art that it is equally applicable to transmission tubes.

In a cathode ray television reception tube, it has been suggested to use a spherical mirror which gathers the light from the luminescent image screen and reflects it through an aspherical correction plate which refracts the light rays to correct the spherical aberration introduced by the mirror, so that when the televised image is cast on a viewing screen it there appears with substantially no distortion. It has been further suggested to construct the tube with the mirror and correction plate as integral parts thereof. However, the construction of such internal optics tubes has been attended heretofore with many difficulties, and particularly with the difficulty of obtaining accurate initial optical alignment of the screen, the mirror, and the correction plate.

Therefore, it is one object of my invention to improve the construction of cathode ray tubes employed in television.

It is a further object of the invention to provide a cathode ray television tube which is initially aligned with great optical accuracy, and which maintains this alignment.

Another object of the invention is to provide a superior and improved method for the assembly and construction of a cathode ray tube used in television.

Other objects, advantages, and novel features of the invention will become apparent as the specification progresses.

In accordance with my invention the foregoing objects are achieved by constructing a tube wherein the image screen, the mirror, and the correction plate are an integral optically aligned unit. I have found that when a supporting framework is employed to position accurately the screen, the mirror, and the correction plate in optically tested alignment, and the tube thereafter assembled without disturbing this alignment, an optically superior image is formed by the television system of which the tube is a part.

In order that the invention may be more clearly understood and readily carried into effect it will now be described with reference to the accompanying drawing in which the sole figure is a longitudinal cross-section of a television projection tube constructed and assembled in a preferred form of the invention.

Referring now to the drawing, a television projection tube 10 has a cylindrical bulbous end portion 11 and a throat portion 12. An electron gun 13 is included in the throat portion so that the cathode rays, or electrons, impinge upon screen 14 on member 14a to form thereon the image to be projected. The gun is illustrated more or less schematically, as the various elements thereof are well known to the art. Leads are brought out at the base of the tube to pins 15. The light from screen 14 strikes spherical mirror 16 and is reflected thence through aspherical correction plate 18. Central aperture 20 in mirror 16 provides free passage for the cathode rays therethrough so that they may be swept across the screen to cause luminescence and produce the image in known fashion. Struts 22, of which I prefer to use four, are attached at one end to correction plate 18 near the periphery thereof, and at the other end to mirror 16 near the periphery thereof.

Brackets 24 are attached to two of the struts. Spider elements 26 extend from two of the brackets toward the optical axis and fit slideably into tie rod 28. The spider elements are provided at their ends with broadened portions 29 and slots 29a therein to permit entry of screws 30 and allow the spider elements 26 to move normally to the plane of the figure. Screws 30 engage in threads provided therefore in brackets 24. Because of the slotted fitting of tie rod 28 to spider elements 26, the rod may move normally to the axis of the tube to the right or left as viewed in the figure, and set screws 32 threaded into the tie rod allow such an adjustment, when made, to be rigidly fixed. A thumb screw 34 is snugly fitted through tie rod 28 centrally and is threaded into member 14a supporting screen 14. A compressional spring 36 exerts pressure between tie rod 28 and screen member 14a, thereby permitting the screen to be axially adjusted accurately depending on how far screw 34 is threaded into the member. Attached to each of struts 22 at a calculated intermediate portion thereof are snubbers 50 bearing against the cylindrical wall of end portion 11 in order to better support and shock protect the elements of the tube. A certain amount of adjustability is also provided for positioning mirror 16 by screws 52 threaded into each strut with springs 54 holding the mirror firmly against the shoulders of the nuts.

In preparing the projection tube for assembly, I first prepare the face plate and have joined thereto the struts. It will be understood that calculations for the proper curvature of correction plate 18, mirror 16, and screen 14 and their relative positions have been made previously. The spider assembly including the screen 14 and the mirror 16 are then affixed. The computations previously made will determine to a close approximation the length of the struts 22 and the position along them at which the spider members 24 are to be attached. The screen and mirror are then tentatively attached and the optical assembly is ready for final optical alignment. The optical alignment may be accomplished by taking the assembly into a dark room, casting a light, preferably a small intense parallel beam against screen 14 through aperture 20. A viewing screen 56 is placed along the optical axis of the system at the same distance from plate 18 at which the viewing screen is to be employed in the projection television system for which the tube is designed. Then I adjust the relative positions of correction plate 18, screen 14, and mirror 16 by means of the screws 26, 34, and 52 and moving tie rod 28 and members 26 until I have attained a sharp clear image upon the viewing screen of image screen 15. Other procedures for the final optical alignment will be apparent to those skilled in the optical art. Thereafter, screws 30 and 32 being tightened into position, and alignment optically re-checked, I find it convenient to lightly spray the various screws with a quick drying adhesive substance which will substantially lock them in place against the possibility of inadvertent motion. The cylindrical walls of the bulbous portion 11 of the tube and the throat portion 12 are separately prepared with the electron gun parts in place in the tube. Then I slip the optically aligned assembly comprising the correction plate, the screen, and the mirror all assembled on the supporting framework, into the tube with the snubbers in place. The periphery of the correction plate where it abuts upon shoulders 60 of the side walls may now be gradually and uniformly heated until an air tight seal is made between the correction plate and the walls of the tube. The tube may then be evacuated in conventional manner and is ready for use. It will be apparent that by my novel construction and method of assembly, the screen, the mirror, and the correction plate of the tube are maintained in accurate critical optical alignment for the life of the tube. The adjustment is much closer than that which has been provided by other methods and types of construction, and more accurate alignment is achieved than by mere mechanical methods.

While I have described my invention with a specific example and application, other variations will suggest themselves to those skilled in the art without departing from the scope and spirit of the invention as defined in the appended claims.

What I claim is:

1. A cathode ray tube for television comprising an envelope having an open ended body portion, and as an integral part of said tube a prefocussed optical projection system within said body portion, said system being initially focussed prior to assembly in the said body portion and remaining in precise optical alignment throughout the life of the tube and comprising an image screen, a mirror, a correction plate, and means independent of said body portion for securing said screen, said mirror and said correction plate in optical alignment relative to each other.

2. A cathode ray tube for television comprising an envelope portion having an open ended body portion, and as an integral part of said tube a prefocussed optical projection system within the said body portion said system being initially focussed prior to assembly in the said body portion and remaining in precise optical alignment throughout the life of the tube and comprising a fluorescent image screen, a mirror, a correction plate, and means independent of the said body portion for securing said screen, said mirror and said correction plate in optical alignment relative to each other.

3. A cathode ray tube for television comprising an envelope having an open ended body portion and as an integral part thereof a prefocussed optical projection system within the said body portion said system being initially focussed prior to assembly in the said body portion and remaining in precise optical alignment throughout the life of the tube and comprising an image screen which fluoresces when a beam of electrons strikes said screen and provides a luminescent image, a spherical mirror disposed within said body portion for projecting the luminescent image on said screen to the front of the tube, said mirror being provided with a centrally disposed aperture to permit passage of a beam of electrons which strikes the screen, an aspherical correcting element disposed in font of said mirror and behind said screen and constituting the front wall of the tube, a spider element for supporting said screen in precise optical relationship between said correcting element and said mirror, means for supporting the screen, mirror, and correcting element within the tube and independent of the said body portion, and means for prealigning said mirror, said screen and said correcting plate in precise optical relationship before insertion into the said body portion and thereafter maintaining the precise optical alignment.

MARK E. AMDURSKY.

REFERENCES CITED

The following references are of record in the file of this patent:

UNITED STATES PATENTS

| Number | Name | Date |
|---|---|---|
| 2,060,825 | Ressler | Nov. 17, 1935 |
| 2,139,678 | Glass | Dec. 13, 1938 |
| 2,295,779 | Epstein | Sept. 15, 1942 |
| 2,299,047 | Winans | Oct. 13, 1942 |
| 2,415,311 | Szegho | Feb. 4, 1947 |
| 2,440,735 | Cawein | May 4, 1948 |
| 2,440,736 | Cawein | May 4, 1948 |
| 2,467,462 | Brown | Apr. 19, 1949 |

FOREIGN PATENTS

| Number | Country | Date |
|---|---|---|
| 452,148 | Great Britain | Aug. 17, 1936 |
| 557,771 | Great Britain | Dec. 3, 1943 |
| 487,241 | Great Britain | June 16, 1938 |